United States Patent
Cai et al.

(10) Patent No.: US 9,346,373 B2
(45) Date of Patent: May 24, 2016

(54) SEATBACK STABILIZATION DEVICE AND VEHICLE EMPLOYING THE SAME

(71) Applicant: FORD GLOBAL TECHNOLOGIES, LLC, Dearborn, MI (US)

(72) Inventors: Bin Cai, Nanjing (CN); Chong Deng, Nanjing (CN); Zhebing Shen, Nanjing (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/514,507

(22) Filed: Oct. 15, 2014

(65) Prior Publication Data
US 2015/0137547 A1 May 21, 2015

(30) Foreign Application Priority Data
Nov. 18, 2013 (CN) .................. 2013 2 0728158 U

(51) Int. Cl.
*B60N 2/015* (2006.01)
*B60N 2/36* (2006.01)

(52) U.S. Cl.
CPC ............... *B60N 2/015* (2013.01); *B60N 2/366* (2013.01)

(58) Field of Classification Search
CPC .... B62D 25/08; B62D 25/087; B62D 25/088; B60N 2/4214; B60N 2/4221; B60N 2/4228; B60N 2/015; B60N 2/366; B60R 2011/0015; B60R 2011/0042; B60R 2011/008; B60R 21/026; B60R 2021/0246
USPC ............... 296/63, 65.01, 65.03, 65.15, 65.16, 296/65.17
See application file for complete search history.

(56) References Cited

U.S. PATENT DOCUMENTS

| | | | | |
|---|---|---|---|---|
| 4,813,722 A * | 3/1989 | Viscome | ................ | B60N 2/366 292/216 |
| 4,904,003 A * | 2/1990 | Yamazaki | ............... | B60N 2/366 292/126 |
| 4,971,380 A * | 11/1990 | Cote | ....................... | B60N 2/682 248/301 |
| 5,664,839 A * | 9/1997 | Pedronno | ........... | B60N 2/01516 296/65.17 |
| 6,196,622 B1 * | 3/2001 | Brodt | .................... | B62D 25/087 296/203.04 |
| 6,485,055 B1 * | 11/2002 | Swayne | ............... | B60N 2/2806 280/801.1 |
| 6,733,078 B1 * | 5/2004 | Zelmanov | ............ | B60N 2/2245 292/201 |
| 6,945,585 B1 | 9/2005 | Liu et al. | | |
| 7,222,893 B2 | 5/2007 | Miyake et al. | | |
| 7,980,618 B2 * | 7/2011 | Kato | ................... | B60N 2/01508 296/24.34 |

(Continued)

FOREIGN PATENT DOCUMENTS

JP 2004238841 A 8/2004
JP 4720440 B2 7/2011

*Primary Examiner* — Gregory Blankenship
(74) *Attorney, Agent, or Firm* — Gregory P. Brown; Law Firm of Dr. Junqi Hang, PLC

(57) ABSTRACT

In one or more embodiments, a vehicle seatback stabilization device includes a seatback stabilization portion to be connected to a seatback, and a vehicle body connection portion including an aperture to receive a connector of a vehicle body load-bearing structure. The seatback stabilization portion may include first and second stabilization panels positioned with an angle relative to each other. The vehicle body connection portion may extend away from the second stabilization panel such that the second stabilization panel is positioned between the first stabilization panel and the vehicle body connection portion.

17 Claims, 4 Drawing Sheets

(56) References Cited

U.S. PATENT DOCUMENTS

| | | | | |
|---|---|---|---|---|
| 8,066,328 B2 * | 11/2011 | Lindsay | ............... | B60N 2/2245 296/65.17 |
| 8,246,088 B2 | 8/2012 | Stechschulte | | |
| 8,356,860 B2 | 1/2013 | Nakaya et al. | | |
| 8,360,472 B2 * | 1/2013 | Froschle | ................ | B60R 21/13 280/756 |
| 8,777,315 B2 * | 7/2014 | Lutzka | .................. | B60N 2/366 296/65.17 |
| 8,985,692 B2 * | 3/2015 | Pacolt | ..................... | B60N 2/20 296/65.05 |
| 2004/0090086 A1 * | 5/2004 | Broadhead | ............. | B60R 5/044 296/193.01 |
| 2004/0104590 A1 * | 6/2004 | Kikuchi | ............. | B60N 2/01583 296/65.03 |
| 2005/0140129 A1 * | 6/2005 | Miki | ....................... | B60R 21/13 280/756 |
| 2011/0187171 A1 * | 8/2011 | Ishii | ........................ | B60N 2/22 297/354.12 |
| 2011/0285161 A1 * | 11/2011 | Sweers | ................. | B60N 2/015 296/37.1 |
| 2013/0278005 A1 * | 10/2013 | Ito | ....................... | B60N 2/0155 296/65.01 |
| 2013/0313849 A1 * | 11/2013 | Ito | ....................... | B60N 2/0155 296/65.01 |
| 2014/0091591 A1 * | 4/2014 | Ishii | .................... | B60N 2/2245 296/65.01 |
| 2014/0138979 A1 * | 5/2014 | Tanaka | .................. | B60N 2/2245 296/65.03 |
| 2014/0327266 A1 * | 11/2014 | Gholap | ................. | B60N 2/442 296/65.16 |
| 2015/0137547 A1 * | 5/2015 | Cai | ........................ | B60N 2/366 296/63 |

* cited by examiner

SEATBACK STABILIZATION DEVICE AND VEHICLE EMPLOYING THE SAME

RELATED APPLICATION(S)

This application claims the benefit of Chinese Utility Model Patent Application No.: CN 201320728158.1, filed Nov. 18, 2013, the entire contents thereof being incorporated herein by reference.

TECHNICAL FIELD

The present invention in one or more embodiments relates to a seatback stabilization device and a vehicle employing the same.

BACKGROUND

For vehicles, contents of the trunk storage may engage in forward movement in the event of a sudden stop. To prevent the mounting frame of a seatback from tilting forward due to the impact, and hence to reduce injuries to the vehicle occupant, it may be desirable to provide relatively enhanced stabilization to the seatback in case of such an impact.

U.S. Pat. No. 8,356,860 discloses a collapsible vehicle seat fixed to a vehicle body by releasable lock and structure. In particular, a pin may be inserted into a recess, and then strikes a latch to cause the latch to turn to a locking position to lock. Such structures tend to be complicated, and the operation of such a releasable latch structure can be cost prohibitive and therefore not necessarily suitable for vehicle rear seats that do not need to be foldable.

In certain existing designs, and for vehicle rear seats which do not need to be foldable, the vehicle rear seats may be installed via connecting three hook members welded onto a mounting frame of the rear seat to a circular member of a stabilization panel such that the mounting frame may be connected to the stabilization panel. Because the three hook members are not durable enough, and the vehicle stabilization panel is not load-bearing and hence not durable enough to sustain impact coming from the rear, it is often needed to install two additional tubular members to provide additional strength.

SUMMARY

In one or more embodiments, a vehicle seatback stabilization device includes a seatback stabilization portion to be connected to a seatback, and a vehicle body connection portion including an aperture to receive a connector of a vehicle body load-bearing structure.

The seatback stabilization portion may include first and second stabilization panels positioned with an angle relative to each other. The vehicle body connection portion may extend away from the second stabilization panel such that the second stabilization panel is positioned between the first stabilization panel and the vehicle body connection portion. The first stabilization panel and the vehicle body connection portion may extend from two opposing edges of the second stabilization panel, respectively. The vehicle body connection portion may be positioned relative to the second stabilization panel with an angle.

The seatback stabilization portion may further include a pair of side walls for clamping a seatback mounting frame of the seatback. The pair of side walls may each define an aperture thereupon. The pair of side walls may each define thereupon first and second apertures extending in two different directions. The vehicle body load-bearing structure may include a vehicle cargo compartment reinforcement structure.

The vehicle body connection portion may further include a cushion sleeve to be received through the aperture and positioned between the arm of the vehicle body load-bearing structure and an inner surface of the aperture.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION OF ONE OR MORE EMBODIMENTS

Figure 1:
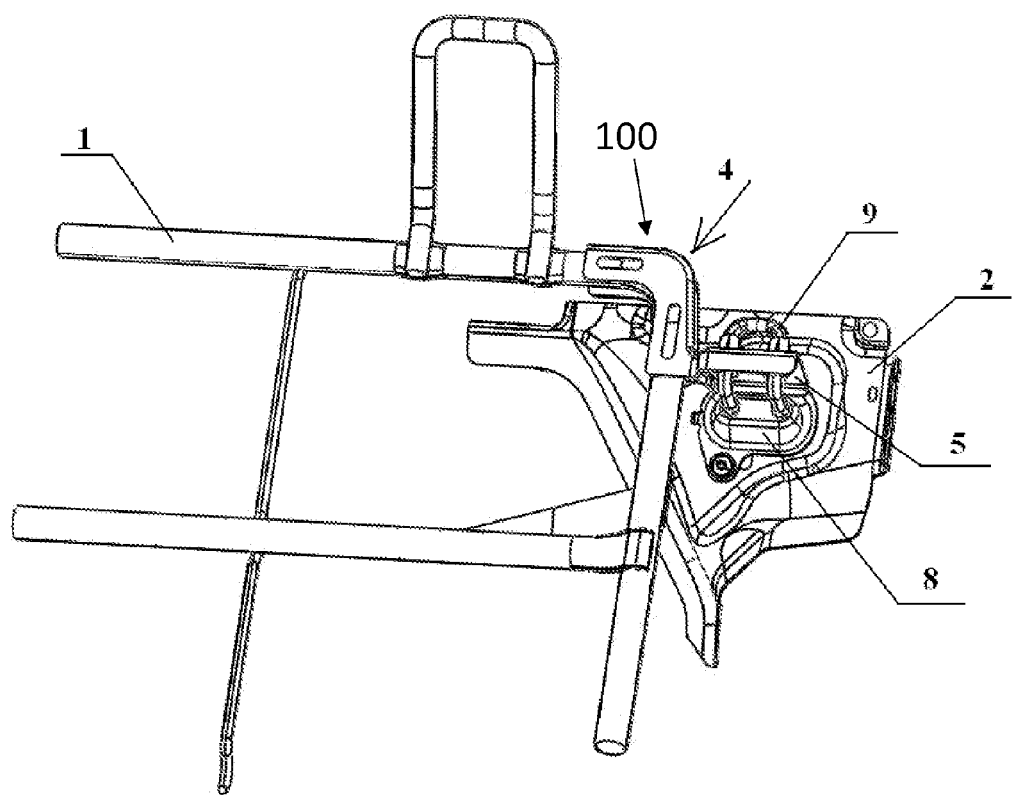
FIG. 1 illustratively depicts a perspective view of a vehicle seatback stabilization device positioned relative to a seatback mounting frame and a vehicle body load-bearing structure.

As referenced in the FIGS., the same reference numerals are used to refer to the same components. In the following description, various operating parameters and components are described for different constructed embodiments. These specific parameters and components are included as examples and are not meant to be limiting.

The present invention in one or more embodiments is believed to be advantageous in providing a seatback stabilization device to secure and stabilize a seatback when the vehicle comes to sudden deceleration or a stop. The seatback stabilization device includes a seatback stabilization portion to be connected to a seatback and a vehicle body connection portion with an aperture to receive a connector of a vehicle body load-bearing structure. In certain embodiments, the vehicle body load-bearing structure includes or may be a cargo reinforcement structure of the vehicle. Thus, the seatback may be indirectly and securely connected to the rather stable cargo reinforcement structure via a connection of the vehicle body connection portion and the seatback stabilization portion.

The present invention in one or more embodiments is believed to be advantageous further in providing a relatively simple mechanism by which the vehicle rear seatbacks may be stabilized in an event of sudden deceleration or a stop. The simple design also facilitates its versatile employment in various vehicle types and hence the realization of enhanced cost efficiency.

Figure 2:
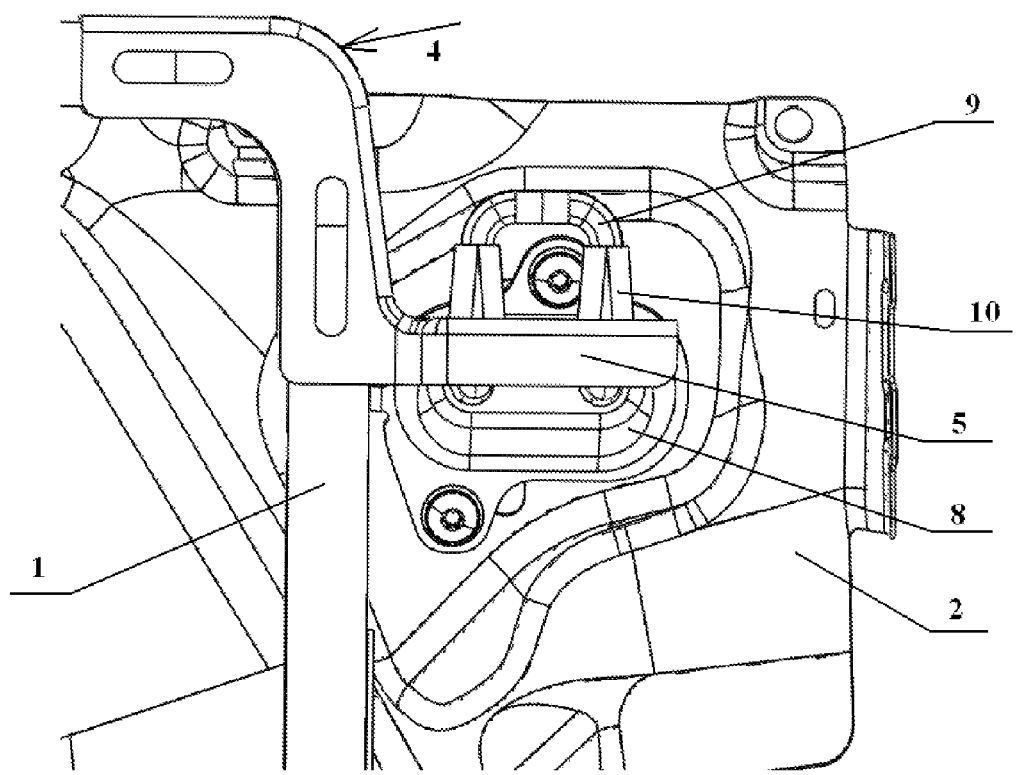
FIG. 2 illustratively depicts a partial view of the vehicle seatback stabilization device referenced in FIG. 1.
Figure 3:
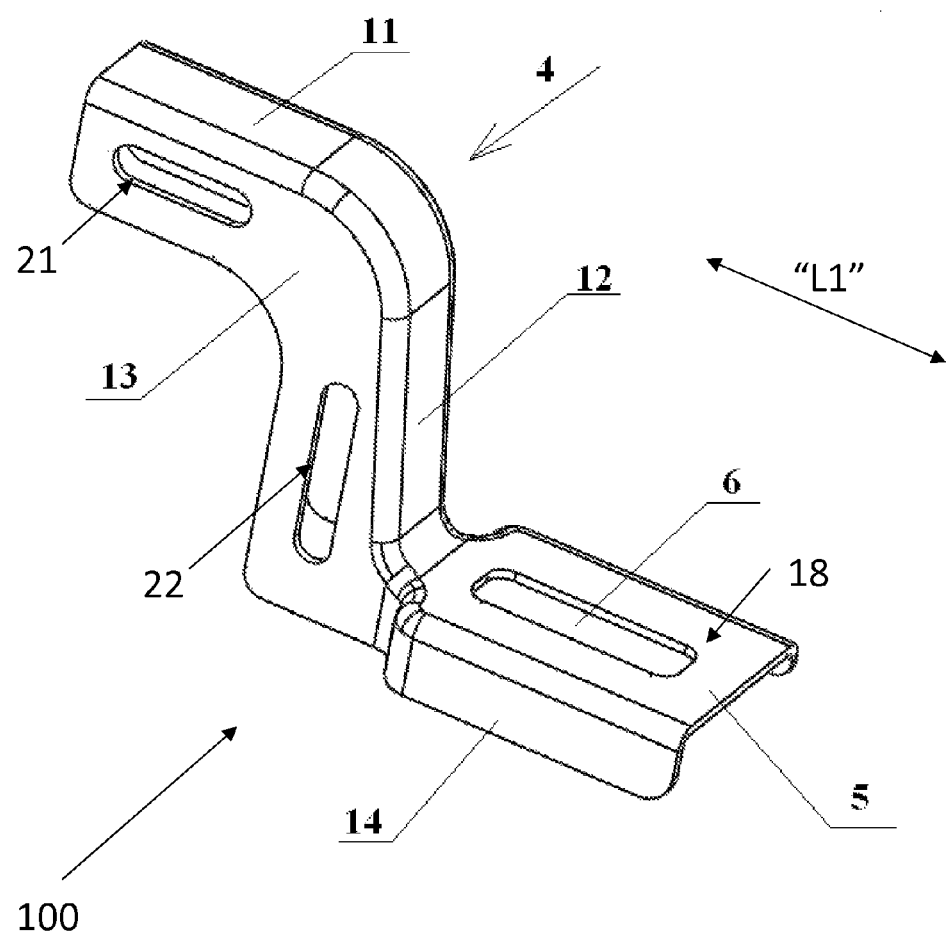
FIG. 3 illustratively depicts an enlarged perspective view of the vehicle seatback stabilization device referenced in FIG. 1.

In one or more embodiments, and as illustratively depicted in FIG. 1 and FIG. 2, a seatback stabilization device generally shown at 100 includes a seatback stabilization portion 4 for connecting a mounting frame 1 of one or more rear seatbacks (not shown) and a vehicle body connection portion 5 for connecting to a vehicle body load-bearing structure 2. Further in view of FIG. 3, the vehicle body connection portion 5 may further include an aperture 6 for connecting to the vehicle load-bearing structure 2. In particular, the aperture 6 may extend longitudinally along a longitudinal axis L1 of the vehicle body connection portion 5.

Referring back to FIG. 3, the seatback stabilization portion 4 may include a first stabilization panel 11 and a second stabilization panel 12 extending from the first stabilization panel 11, wherein the first stabilization panel 11 is positioned with an angle relative to the second stabilization panel 12. The vehicle body connection portion 5 may further include a pair of side walls 14 sandwiching there between a connection panel 18 upon which the aperture 6 is defined. The vehicle body connection portion 5 extends from the second stabilization panel 12 and is directed away from the first stabilization panel 11, such that the second stabilization panel is positioned between the first stabilization panel 11 and the vehicle body connection portion 5. Optionally the vehicle body connection portion 5 extends in a plane that is parallel to a plane in which the first stabilization panel 11 extends. Optionally also, one or more reinforcing ribs (not shown) may be positioned between the seatback stabilization portion 4 and the vehicle body connection portion 5 to provide enhanced strength.

Referring back to FIG. 3, the seatback stabilization portion 4 may further include a pair of first side walls 13 for securing the mounting frame 1. The first side walls 13 may extend away from the first stabilization panel 11 and the second stabilization panel 12. Optionally, one or more apertures 21, 22 may be defined upon the first side walls 13. More particularly, a pair of apertures 21 may each be defined on the first side walls 13 which at least partially sandwich there between the first stabilization panel 11. More particularly also, a pair of apertures 22 may each be defined on the first side walls 13 which at least partially sandwich there between the second stabilization panel 12. Optionally also both ends of the mounting frame 1 may each be provided with the seatback stabilization assembly 100 to provide additional stability.

Referring back to FIG. 3, the aperture 6 may be an elongated aperture extending in a direction different from a direction the second stabilization panel 12 extends in. As mentioned herein elsewhere, the second side walls 14 may be provided to extend away from and be positioned with an angle relative to the plane in which the aperture 6 or the connection panel 18 extends in.

Figure 4:
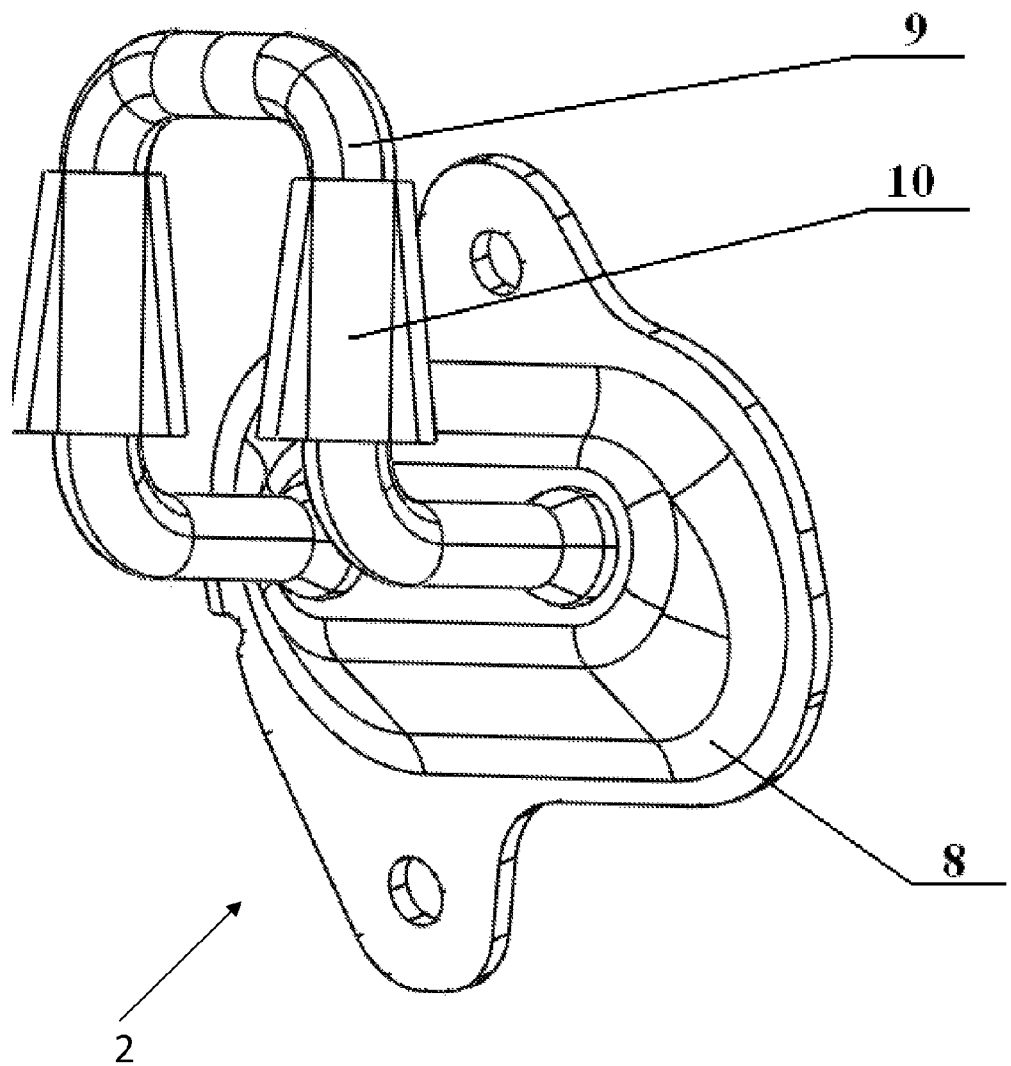
FIG. 4 illustratively depicts a partial view of the vehicle body load-bearing structure referenced in FIG. 1.

With further reference to FIG. 4, the vehicle body load-bearing structure 2 may include a connector 9 which is optionally angled to be received through the aperture 6, such that the connector 9 of the vehicle body load-bearing structure 2 is engaged with the aperture 6 as illustratively depicted in FIG. 1 and FIG. 2. The connector 9 is not limited to be in a configuration as illustratively depicted in FIG. 1, FIG. 2 or FIG. 4. The connector 9 may be of any suitable angled configuration, for instance being angled downward, leftward or rightward, as long as the angled configuration facilitates the engagement through the aperture 6 and sustains the impact from a sudden vehicle movement. Moreover, the engagement between the connector 9 and the aperture 6 is not limited to the form shown in FIG. 4, and may be configured in various forms as long as the engagement sustains the impact of an incoming force due to any sudden vehicle movement. Non-limiting examples of the configuration forms of the connector 9 include an arrow, a hook, a forked double-hook, an elastic connector and snap-in plug.

Optionally and as illustratively depicted in FIG. 4, a cushion or shock-absorbing sleeve 10 may be provided to the connector 9, wherein the shock-absorbing sleeve 10 is received through the aperture 6 and positioned between the connector 9 and an inner wall of the aperture 6. Optionally also, the connector 9 may include or be formed of metallic wires or in particular metallic wires intertwined among each other. Of course, the connector 9 may include or be formed of any other suitable materials.

The vehicle body load-bearing structure 2 may be any suitable vehicle body load-bearing structure, and in certain embodiments may be a vehicle cargo compartment reinforcement structure.

In certain existing designs, vehicle rear seats may be directly connected to vehicle rear storage support frames, which are then connected to vehicle load-bearing structures such as vehicle cargo compartment reinforcement structures. In these instances, the vehicle rear storage support frames are often formed of non-metal materials and are connected to the vehicle body indirectly via the vehicle cargo compartment reinforcement structures, and therefore are only provided with limited resistance to any impact coming from the rear. Accordingly, additional reinforcement structures may be needed to relatively ensure the vehicle rear seats are resistant to impactful forces.

The vehicle load-bearing structure 2 may be directly connected to or itself includes a vehicle cargo compartment reinforcement structure for supporting storage frames or other similar vehicle load bearing structures. In this connection, and because the vehicle cargo compartment structure is directly connected to the vehicle steel frames via welding or other known methods, the connection is stable and secure and does not necessarily require additional rear storage support frames. Referring back to FIG. 4, the vehicle body load-bearing structure 2 includes a base 8, the connector 9 extending from the base 8, and the base 8 is connected to the vehicle cargo compartment reinforcement structure optionally via bolts. Accordingly, the vehicle according to one or more embodiments of the present invention may be provided with relatively reduced complexity and enhanced cost efficiency.

In summary, the seatback stabilization device 100 includes the vehicle body connection portion 5 to be connected to the vehicle cargo compartment reinforcement structure for supporting storage frames, and the seatback stabilization portion 4 to be connected to the seatback mounting frame 1. Therefore via a connection between the seatback stabilization portion 4 and the vehicle body connection portion 5, the vehicle seatback mounting frame 1 is securely connected to the vehicle cargo compartment reinforcement structure. Because the vehicle cargo compartment structure is directly connected to the vehicle steel frames via welding or other known methods, the connection is stable and secure and does not necessarily require additional rear storage support frames. Accordingly, the vehicle may be provided with relatively reduced complexity and enhanced cost efficiency.

In addition, and because the connector 9 of the vehicle body load-bearing structure 2 extends out and is received through the aperture 6 via an angled configuration, the connector 9 with the angle configuration may exert an effective pulling on the seatback stabilization portion 4 against a force due to sudden deceleration or a stop. Accordingly the connection between the seat stabilization portion 4 and seatback mounting frame 1 is enhanced.

The present invention in another or more embodiments also provides a vehicle which includes the seatback stabilization device 100 described herein elsewhere. With the seatback stabilization device 100, the vehicle rear seats may be relatively more stabilized in resisting impact from the rear storage when the vehicle decelerates or comes to a sudden stop.

Of course, the vehicle seatback stabilization device 100 does not have to be limited to the configurations described and depicted herein. For instance, the connector 9 may be provided with any suitable structures or configurations. However, the seatback stabilization device 100 may be mainly used for rear seats with pre-fixed positions, in which the connector 9 may be alternatively used in vehicles with 6/4 foldable seats. Therefore both pre-fixed rear seats and 6/4 foldable seats may adopt the same connector 9 for carrying out the stabilization, so as to bring additional efficiencies in design, molding and processing.

In one or more embodiments, the present invention as set forth herein is believed to have overcome certain challenges in achieving reasonable amount of vehicle rear seatback stabilization. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle seatback stabilization device, comprising:
   a seatback stabilization portion to be connected to a seatback and including first and second stabilization panels positioned with an angle relative to each other; and
   a vehicle body connection portion including an aperture to receive a connector of a vehicle body load-bearing structure, wherein the seatback stabilization portion further includes a pair of side walls for clamping a seatback mounting frame of the seatback.

2. The vehicle seatback stabilization device of claim 1, wherein the vehicle body connection portion extends away from the second stabilization panel such that the second stabilization panel is positioned between the first stabilization panel and the vehicle body connection portion.

3. The vehicle seatback stabilization device of claim 1, wherein the first stabilization panel and the vehicle body connection portion extend from two opposing edges of the second stabilization panel, respectively.

4. The vehicle seatback stabilization device of claim 1, wherein the vehicle body connection portion is positioned relative to the second stabilization panel with an angle.

5. The vehicle seatback stabilization device of claim 1, wherein the pair of side walls each define an aperture thereupon.

6. The vehicle seatback stabilization device of claim 1, wherein the pair of side walls each define thereupon first and second apertures extending in two different directions.

7. The vehicle seatback stabilization device of claim 1, wherein the connector includes an angled arm, and the aperture on the vehicle body connection portion has dimensions to receive the angled arm of the vehicle body load-bearing structure.

8. A vehicle with relatively enhanced seatback stability, comprising:
   a rear seat including a seatback;
   a vehicle body load-bearing structure; and
   a seatback stabilization device including a seatback stabilization portion connected to the seatback and a vehicle body connection portion with an aperture to receive a connector of the vehicle body load-bearing structure, wherein the seatback stabilization portion further includes a pair of side walls for clamping a seatback mounting frame of the seatback, and wherein the seatback stabilization portion further includes first and second stabilization panels positioned with an angle relative to each other.

9. The vehicle of claim 8, wherein the vehicle body connection portion extends away from the second stabilization panel such that the second stabilization panel is positioned between the first stabilization panel and the vehicle body connection portion.

10. The vehicle of claim 8, wherein the first stabilization panel and the vehicle body connection portion extend from two opposing edges of the second stabilization panel, respectively.

11. The vehicle of claim 8, wherein the vehicle body connection portion is positioned relative to the second stabilization panel with an angle.

12. A vehicle seatback stabilization device, comprising:
   a seatback stabilization portion to be connected to a seatback; and
   a vehicle body connection portion including an aperture to receive a connector of a vehicle body load-bearing structure, wherein the vehicle body connection portion further includes a cushion sleeve to be received through the aperture and positioned between the connector of the vehicle body load-bearing structure and an inner surface of the aperture.

13. The vehicle seatback stabilization device of claim 12, wherein the seatback stabilization portion includes first and second stabilization panels positioned with an angle relative to each other.

14. The vehicle seatback stabilization device of claim 13, wherein the vehicle body connection portion extends away from the second stabilization panel such that the second stabilization panel is positioned between the first stabilization panel and the vehicle body connection portion.

15. The vehicle seatback stabilization device of claim 13, wherein the first stabilization panel and the vehicle body connection portion extend from two opposing edges of the second stabilization panel, respectively.

16. The vehicle seatback stabilization device of claim 13, wherein the vehicle body connection portion is positioned relative to the second stabilization panel with an angle.

17. The vehicle seatback stabilization device of claim 12, wherein the connector includes an angled arm, and the aperture on the vehicle body connection portion has dimensions to receive the angled arm of the vehicle body load-bearing structure.

* * * * *